(12) United States Patent
Stallmann

(10) Patent No.: US 8,951,488 B2
(45) Date of Patent: Feb. 10, 2015

(54) METHOD AND SYSTEM FOR $NO_x$ REDUCTION IN FLUE GAS

(71) Applicant: ALSTOM Technology Ltd, Baden (CH)

(72) Inventor: Olaf Stallmann, Essenheim (DE)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 14/182,347

(22) Filed: Feb. 18, 2014

(65) Prior Publication Data

US 2014/0161700 A1    Jun. 12, 2014

Related U.S. Application Data

(63) Continuation of application No. PCT/IB2012/001628, filed on Aug. 23, 2012.

(30) Foreign Application Priority Data

Aug. 24, 2011 (EP) .................................... 11178648

(51) Int. Cl.
| | |
|---|---|
| *B01D 53/46* | (2006.01) |
| *B01D 53/56* | (2006.01) |
| *B01D 53/86* | (2006.01) |
| *F01N 3/20* | (2006.01) |
| *B01D 53/00* | (2006.01) |
| *B01D 53/26* | (2006.01) |

(52) U.S. Cl.
CPC ............ *B01D 53/565* (2013.01); *B01D 53/002* (2013.01); *B01D 53/261* (2013.01); *B01D 53/8625* (2013.01); *B01D 2256/22* (2013.01); *F01N 3/2066* (2013.01)
USPC ........ 423/219; 423/239.1; 422/168; 422/169; 422/170; 422/173; 422/180

(58) Field of Classification Search
USPC ............... 423/219, 239.1; 422/168, 169, 170, 422/173, 180
See application file for complete search history.

(56) References Cited

U.S. PATENT DOCUMENTS

| | | | |
|---|---|---|---|
| 7,070,746 B1 * | 7/2006 | Notte et al. .................... | 423/219 |
| 8,173,090 B2 * | 5/2012 | Petrocelli et al. ........ | 423/243.08 |
| 2012/0219487 A1 * | 8/2012 | Chang et al. ................ | 423/239.1 |

* cited by examiner

*Primary Examiner* — Timothy Vanoy

(57) ABSTRACT

The present invention relates to a method of cleaning a carbon dioxide rich flue gas stream containing oxygen. The method includes heating the flue gas stream to a temperature suitable for selective catalytic reduction (SCR) of $NO_x$; and reducing at least some of the $NO_x$ in the heated flue gas stream to $N_2$ by SCR. Heating of the flue gas stream includes removal of residual oxygen contained in the flue gas by catalytic oxidation of a suitable carburant. The present invention further relates to a gas processing unit.

20 Claims, 2 Drawing Sheets

METHOD AND SYSTEM FOR $NO_x$ REDUCTION IN FLUE GAS

CROSS-REFERENCE TO RELATED APPLICATIONS

This application claims priority to PCT/IB2012/001628 filed Aug. 23, 2012, which in turn claims priority to European application 11178648.9 filed Aug. 24, 2011, both of which are hereby incorporated in their entireties.

TECHNICAL FIELD

The present invention relates to a method of cleaning a carbon dioxide rich flue gas stream containing oxygen.

The present invention further relates to a gas processing unit for cleaning a carbon dioxide rich flue gas stream containing oxygen.

BACKGROUND

In the combustion of a fuel, such as coal, oil, peat, waste, etc., in a combustion plant, such as a power plant, a hot process gas is generated, such process gas containing, among other components, carbon dioxide $CO_2$. With increasing environmental demands various processes for removing carbon dioxide from the process gas have been developed. One such process is the so called oxy-fuel process. In an oxy-fuel process a fuel, such as one of the fuels mentioned above, is combusted in the presence of a nitrogen-lean gas. Oxygen gas, which is provided by an oxygen source, is supplied to a boiler in which the oxygen gas oxidizes the fuel. In the oxy-fuel combustion process a carbon dioxide rich flue gas is produced, which can be treated using various $CO_2$ capture technologies in order to reduce the emission of carbon dioxide into the atmosphere.

$CO_2$ capture often comprises cooling, or compression and cooling, of the flue gas to separate $CO_2$ in liquid or solid form from non-condensable flue gas components, such as $N_2$ and $O_2$.

Prior to $CO_2$ capture, it is generally necessary to clean the carbon dioxide rich flue gas. Gas cleaning operation may generally include removal of dust, sulfur compounds, metals, nitrogen oxides, etc.

In order to prevent ice formation in heat exchangers used in the $CO_2$ capture process, wet flue gas must also be dried before being subjected to cooling. In order to achieve the desired dryness of the flue gas, an adsorption drier may be employed. The adsorption drier uses an adsorbent, such as molecular sieves, to efficiently remove water from the flue gas. A problem with many adsorption driers is that the adsorbent, such as molecular sieves, may be sensitive to acid degradation by acids formed by acid gases and water adsorbed by the adsorbent. Such acid degradation may seriously reduce the effective life span of the adsorbent.

Selective catalytic reduction (SCR) is a means of converting nitrogen oxides, also referred to as $NO_x$, with the aid of a catalyst into diatomic nitrogen, $N_2$, and water, $H_2O$. A gaseous reduction medium, typically anhydrous ammonia, aqueous ammonia or urea, is added to a stream of flue or exhaust gas and is adsorbed onto a catalyst. The $NO_x$ reduction reaction takes place as the gases pass through the catalyst chamber. Before entering the catalyst chamber the ammonia, or other reduction medium, is injected and mixed with the gases. The SCR reaction is typically performed at a temperature in the range of 200° C. to 500° C. The minimum effective temperature depends, e.g., on the gas constituents and catalyst geometry. SCR catalysts are manufactured from various ceramic materials used as a carrier, such as titanium oxide, and active catalytic components are usually either oxides of base metals (such as vanadium and tungsten), zeolites, and/or various precious metals. Each catalyst component has advantages and disadvantages.

A problem with SCR is that the catalyst may become clogged by incoming soot, fly ashes and other particulate materials, such as metals. This clogging may reduce the efficiency and effective life span of the SCR catalyst.

SUMMARY

An object of the present invention is to provide a method and system for cleaning a carbon dioxide rich flue gas stream containing oxygen, e.g. from a so called oxy-fuel system, the method alleviating at least one of the above mentioned problems.

In addition to carbon dioxide, the carbon dioxide rich flue gas stream generally comprises water vapor and $NO_x$, which must be at least partially removed from the flue gas prior to carbon dioxide capture. The carbon dioxide rich flue gas stream further comprises residual oxygen gas.

Selective catalytic reduction (SCR) requires high temperatures, for example in the range of 190 to 600° C., in order to be effective. For example in power plants the SCR step, when present in prior art gas treatment systems, is generally performed in direct connection, or shortly after, the combustion step, where the flue gas stream is already present at high temperature.

In the gas cleaning methods and systems proposed herein, the SCR step instead uses the cool flue gas stream and involves heating the flue gas stream to a temperature suitable for SCR. More specifically, the SCR step may be performed in the gas compression and purification unit of the oxy-fuel system, wherein the carbon dioxide rich flue gas is compressed and cooled in a series of compression stages, and finally separated in liquid form.

According to aspects illustrated herein, there is provided a method of cleaning a carbon dioxide rich flue gas stream containing oxygen, said method comprising:

heating the flue gas stream to a temperature suitable for selective catalytic reduction (SCR) of $NO_x$; and reducing at least some of the $NO_x$ in the heated flue gas stream to $N_2$ by SCR;

characterized in that said heating of the flue gas stream comprises catalytic removal of residual oxygen contained in the flue gas by oxidation of a suitable carburant.

The temperature suitable for selective catalytic reduction (SCR) of $NO_x$ is typically in the range of 190° C. to 600° C., such as in the range of 200° C. to 350° C. The heating of the flue gas stream could be achieved using a suitable conventional electrical or steam heating system. However, an apparent disadvantage of such conventional heating systems is that they increase the overall high quality energy requirement of the process. It has now been found that residual oxygen gas in the carbon dioxide rich flue gas stream may be used for heating the flue gas stream to the required level for $NO_x$ removal by SCR. This can be done by letting the residual oxygen contained in the flue gas react with a suitable carburant using a catalyst system. The carburant is added to the flue gas stream upstream of the catalyst system, and oxygen in the flue gas is then removed in a catalyst bed of the catalyst system by oxidation of the carburant. The heat generated by this exothermic reaction causes the temperature of the flue gas to increase. The temperature increase can be controlled by adjusting of the amount of carburant added to the flue gas.

According to an embodiment, the exothermic reaction increases the flue gas temperature to the temperature suitable for selective catalytic reduction (SCR) of $NO_X$, i.e. to in the range of 190° C. to 600° C., such as to in the range of 200° C. to 350° C. The carburant may be any combustible gas, liquid or even solid material that is compatible with the catalyst system. The carburant may for example be hydrogen gas or a hydrocarbon. Examples of suitable carburants include hydrogen gas, natural gas and methane and mixtures thereof. Depending of the carburant the required catalytic oxidation temperature may be higher than the temperature needed for NOx reduction. In such case a gas/gas heater is foreseen to cool the oxidation reactor outlet by heating of the oxidation reactor feed.

According to an embodiment, the heating comprises:

pre-heating the flue gas stream to a first temperature by indirect heat-exchange with the flue gas stream resulting from the SCR; and then super-heating the pre-heated flue gas stream to a temperature suitable for selective catalytic reduction (SCR) of $NO_X$, characterized in that said super-heating of the flue gas stream comprises catalytic removal of residual oxygen contained in the flue gas by oxidation of a suitable carburant.

Pre-heating the flue gas using the flue gas stream resulting from the SCR is advantageous because it reduces the amount of carburant required for super-heating the pre-heated flue gas stream to a temperature suitable for selective catalytic reduction.

According to an embodiment, the flue gas cleaning method further comprises subjecting the flue gas stream to flue gas condensation prior to heating the flue gas stream. Flue gas condensation may significantly reduce the total flue gas flowrate, thus reducing the required size of the flue gas heater, SCR and drier units downstream. The flue gas entering the FGC usually contains about 40% by volume of water. After the FGC the flue gas usually contains about 5% by volume of water. A further advantage of the FGC is that wash liquid or slurry, e.g. lime slurry, entrained in the flue gas from the preceding sulfur dioxide removal step is removed during the condensation, thus reducing the problems of fouling and/or clogging of the SCR catalyst and/or gas heater surfaces.

According to an embodiment, the method further comprises subjecting the flue gas stream to compression to a pressure in the range of 2 to 55 bar absolute prior to heating the flue gas stream. It has been found that compression of the flue gas prior to the SCR step is preferred, since at elevated pressure almost all of the $NO_X$ in the flue gas is available as $NO_2$.

According to an embodiment, the method further comprises removing at least some of the water vapor from the $NO_X$-depleted flue gas stream by adsorption in an adsorption drier. In the selective catalytic reduction, water is formed as a product. Before the flue gas can be treated for separation of $CO_2$, e.g. by compression and cooling, it may be advantageous to remove at least some of this water from the flue gas, in order to prevent ice formation.

According to an embodiment, the SCR step is performed downstream of the compression step, but upstream of the water removal step.

In some embodiments the method further comprises subjecting the carbon dioxide rich flue gas to a mercury removal step prior to $CO_2$ capture. The mercury removal step is generally performed downstream of the compression step, but upstream of the water removal step. When such a mercury removal step is present, the SCR step may be performed either between the compression step and the mercury removal step or between the mercury removal step and the water removal step. Performing the SCR step downstream of the mercury removal step would eliminate the possible poisoning of the SCR catalyst by mercury entrained in the flue gas.

A gas processing unit (GPU) for treatment of a carbon dioxide rich flue gas stream may typically include a flue gas condenser for reducing the water content of the flue gas and a gas compression and purification system for additional cleaning and subsequent separation of $CO_2$ in liquid form from non-condensable flue gas components, such as $N_2$ and $O_2$.

According to other aspects illustrated herein, there is provided a gas processing unit for cleaning a carbon dioxide rich flue gas stream containing oxygen, said unit comprising:

a flue gas heater configured to heat the flue gas stream to a temperature suitable for selective catalytic reduction of $NO_X$;

a selective catalytic reduction reactor (SCR reactor) configured to receive heated flue gas from the flue gas heater and reduce at least some of the $NO_X$ in the heated flue gas stream to $N_2$ by selective catalytic reduction;

characterized in that said flue gas heater comprises a carburant supply device and a catalyst system, wherein said catalyst system is operative for reduction of residual oxygen contained in the flue gas using carburant from the carburant supply device.

According to an embodiment, the flue gas heater comprises:

a flue gas pre-heater configured to heat the flue gas stream to a first temperature by indirect heat-exchange with the flue gas stream leaving the SCR reactor; and a flue gas super-heater configured to heat the pre-heated flue gas stream to temperature suitable for selective catalytic reduction (SCR) of $NO_X$, characterized in that said flue gas super-heater comprises a carburant supply device and a catalyst system, wherein said catalyst system is operative for reduction of residual oxygen contained in the flue gas using carburant from the carburant supply device.

Pre-heating the flue gas using the flue gas stream resulting from the SCR reactor is advantageous because it reduces the amount of carburant required for super-heating the pre-heated flue gas stream to a temperature suitable for selective catalytic reduction.

According to an embodiment, the GPU further comprises a flue gas condenser arranged upstream of the flue gas heater. Flue gas condensation may significantly reduce the total flue gas flowrate, thus reducing the required size of the flue gas heater, SCR and drier units downstream. The flue gas entering the FGC usually contains about 40% by volume of water. After the FGC the flue gas usually contains about 5% by volume of water. A further advantage of the FGC is that wash liquid or slurry, e.g. lime slurry, entrained in the flue gas from the preceding sulfur dioxide removal step is removed during the condensation, thus reducing the problems of fouling and/or clogging of the SCR catalyst and/or gas heater surfaces.

According to an embodiment, the GPU further comprises a flue gas compressor arranged upstream of the flue gas heater. The flue gas compressor may preferably be capable of compressing the flue gas to a pressure in the range of 2 to 55 bar absolute. It has been found that compression of the flue gas prior to the SCR reactor is preferred, since at elevated pressure almost all of the $NO_X$ in the flue gas is available as $NO_2$.

According to an embodiment, the GPU further comprises an adsorption drier configured to remove at least some of the water from the $NO_X$-depleted flue gas stream by adsorption. In the selective catalytic reduction, water is formed as a product. Before the flue gas can be treated for separation of $CO_2$, e.g.

by compression and cooling, it may be advantageous to remove at least some of this water from the flue gas, in order to prevent ice formation.

According to an embodiment, the SCR reactor is arranged downstream of the flue gas compressor, but upstream of the adsorption drier.

According to an embodiment, the GPU further comprises a mercury adsorption unit. The mercury adsorption unit is generally arranged downstream of the flue gas compressor, but upstream of the adsorption drier. When a mercury adsorption unit is present, the SCR reactor may be arranged either between the flue gas compressor and the mercury adsorption unit or between the mercury adsorption unit and the adsorption drier. Performing the SCR step downstream of the mercury removal step would eliminate the possible poisoning of the SCR catalyst by mercury entrained in the flue gas.

The above described and other features are exemplified by the following figures and detailed description. Further objects and features of the present invention will be apparent from the description and the claims.

BRIEF DESCRIPTION OF THE DRAWINGS

Referring now to the figures, which are exemplary embodiments, and wherein the like elements are numbered alike.

DETAILED DESCRIPTION

Figure 1:
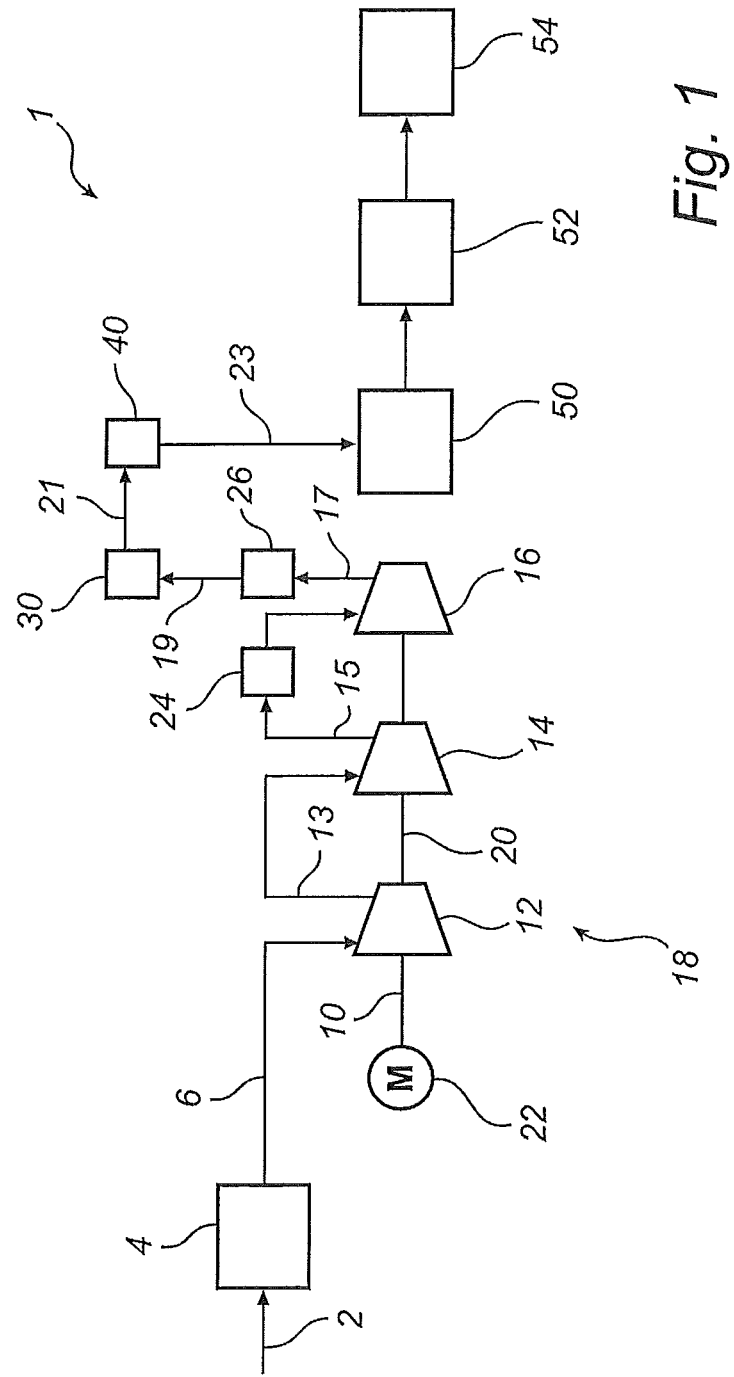
FIG. 1 schematically depicts an embodiment of a GPU.

FIG. 1 illustrates a gas processing unit (GPU) in more detail. It will be appreciated that the illustration of FIG. 1 is schematic, and that a GPU may comprise further devices for gas purification etc.

The GPU 1 comprises a flue gas condenser (FGC) 4 wherein the flue gas is cooled below its water dew point and the heat released by the resulting condensation is recovered as low temperature heat. The water content of the flue gas may for example be reduced from about 40% by volume in the flue gas fed to the flue gas condenser to about 5% by volume in the flue gas leaving the flue gas condenser. Depending on pH and temperature in the flue gas condenser, the flue gas condensation may also lead to a reduction of sulfur oxides, $SO_X$, in the flue gas. The sulfur oxides are captured in the formed condensate and separated from the flue gas. Furthermore, wash liquid or slurry, e.g. lime slurry, entrained in the flue gas from the preceding sulfur dioxide removal step is removed during the condensation, thus reducing the problems of fouling and/or clogging of the SCR catalyst and/or gas heater surfaces.

The GPU 1 further comprises at least one flue gas compressor 10. The compressor has at least one, and typically two to ten compression stages for compressing the cleaned carbon dioxide rich flue gas coming from the flue gas condenser 2. Each compression stage could be arranged as a separate unit. As an alternative, and as illustrated in FIG. 1, several compression stages could be operated by a common drive shaft. The GPU 1 of FIG. 1 comprises a compressor 10 having a first compression stage 12, a second compression stage 14, and a third compression stage 16. The first to third compression stages 12, 14, 16 form together a low pressure compression unit 18 of the GPU 1. The compression stages 12, 14, 16 are connected to a common drive shaft 20 which is driven by a motor 22 of the compressor 10.

Furthermore, the low pressure compression unit 18 may also comprise an intercooling unit 24, downstream of one or more of the compression stages 12, 14, 16. Hence, intercooling units 24 may be arranged downstream of the first, and second compression stages 12, and 14 of the GPU 1 of FIG. 1. One such optional intercooling unit 24 is illustrated downstream of the second compression stage 14. The intercooling unit may further be configured to collect and dispose of any liquid condensate formed during compression and/or cooling.

During compression of the flue gas a reaction may take place that converts sulphur oxides, $SO_X$, with liquid water to their respective acids, using $NO_2$ as a catalyst. The formed acids may then be separated in an intercooling unit 24 arranged downstream of the first, and/or second compression stages. Thus, the low pressure compression unit 18 may contribute to the reduction of $SO_X$ in the flue gas.

The GPU 1 may comprise at least one mercury adsorption unit 26 which is arranged downstream of one of the compression stages 12, 14, 16. In the embodiment of FIG. 1, the mercury adsorption unit 26 is arranged downstream of the third compression stage 16, i.e., downstream of the low pressure compression unit 18. It will be appreciated that the mercury adsorption unit 26 could also have been arranged downstream of the first compression stage 12, or downstream of the second compression stage 14. It is also possible to arrange more than one mercury adsorption unit 26 in the GPU, for example one mercury adsorption unit downstream of the second compression stage 14, and one mercury adsorption unit downstream of the third compression stage 16. The mercury adsorption unit 26 is provided with a packing comprising a mercury adsorbent having affinity for mercury. The adsorbent may, for example, be activated carbon impregnated with sulfur, or another material that is, as such, known for its affinity for mercury. Hence, as compressed carbon dioxide rich flue gas passes through the packing, at least a portion of the content of mercury of the gas will be adsorbed on the mercury adsorbent of the packing.

The GPU 1 comprises at least one selective catalytic reduction unit (SCR unit) 30. The SCR unit 30 is arranged upstream of the adsorption drier 40 and may be arranged downstream of one of the compression stages 12, 14, 16 of the low pressure compression unit 18. In the embodiment of FIG. 1, the SCR unit is arranged downstream of the low pressure compression unit 18, directly downstream of the third compression stage 16. Alternative arrangements (not shown in FIG. 1) of the SCR unit include upstream of the low pressure compression unit 18 but downstream of the flue gas condenser 4, and between the compression stages 12 and 14 or between the compression stages 14 and 16 of the low pressure compression unit 18. Other arrangements of the SCR unit in the GPU 1 upstream of the adsorption drier 40 are also possible. Particularly, in an embodiment of the gas processing unit comprising a mercury adsorption unit, the mercury adsorption unit may be arranged downstream of the flue gas compressor, but upstream of the adsorption drier. When such a mercury adsorption unit is present downstream of the flue gas compressor, but upstream of the adsorption drier, the SCR unit may be arranged either between the flue gas compressor and the mercury adsorption unit or between the mercury adsorption unit and the adsorption drier. In the embodiment of FIG. 1, the SCR unit 30 is arranged between the mercury adsorption unit 26 and the adsorption drier 40. Performing the SCR step downstream of the mercury removal step eliminates the possible poisoning of the SCR catalyst by mercury entrained in the flue gas. The SCR unit 30, is described in detail below with reference to FIG. 2.

The GPU 1 further comprises an adsorption drier 40, operative for removing at least a portion of the content of water vapour of the flue gas.

The adsorption drier 40 is arranged downstream of the SCR unit 30, but upstream of the $CO_2$ separation unit 50. As shown in FIG. 1, the adsorption drier 40 may be arranged directly downstream of the SCR unit 30, such that flue gas treated by the SCR unit 30 is directly forwarded to the adsorption drier 40, optionally after suitable cooling of the flue gas stream in a gas cooler (not shown), and/or extraction of heat from the flue gas stream in one or more flue gas economizers, e.g. for pre-heating boiler feed water.

The adsorption drier 40 has a flue gas inlet and a flue gas outlet and contains an adsorbent or desiccant capable of adsorbing water molecules from a gas stream. The adsorbent may be molecular sieves having a pore size suitable for adsorption of water, e.g. molecular sieves having a pore size in the range of 3 to 5 Å.

The adsorption drier 40 may be provided with a regeneration and heating system (not shown) for intermittent regeneration of the water vapour adsorption capacity of the adsorption drier 40. A supply duct is arranged for supplying a regeneration gas to the system. The regeneration gas is preferably an inert gas which does not react with the packing of the adsorption drier. Examples of suitable gases include nitrogen or another inert gas that, preferably, holds a low amount of mercury and water vapour. Preferably, inert off gas, usually comprising nitrogen as one of its main constituents, separated from the carbon dioxide in the $CO_2$ separation unit 50 is utilized as regeneration gas. The regeneration system comprises a heater which is adapted for heating the regeneration gas. A heating circuit is connected to the heater for circulating a heating medium, such as steam, in the heater. For regeneration of the material of the packing of the gas drier 40, the heater may typically heat the regeneration gas to a temperature of about 120-300° C. During a regeneration sequence, the heated regeneration gas is supplied to the gas drier 40 from the regeneration and heating system. The regeneration gas heats the material of the packing and causes a desorption of water vapour.

According to one embodiment, the GPU 1 may be provided with two parallel gas driers 40, with one of those parallel gas driers being in operation while the other parallel gas drier undergoes regeneration. According to another embodiment, the carbon dioxide rich flue gas could be emitted to the atmosphere during the regeneration of the packing of the gas drier.

Figure 2:
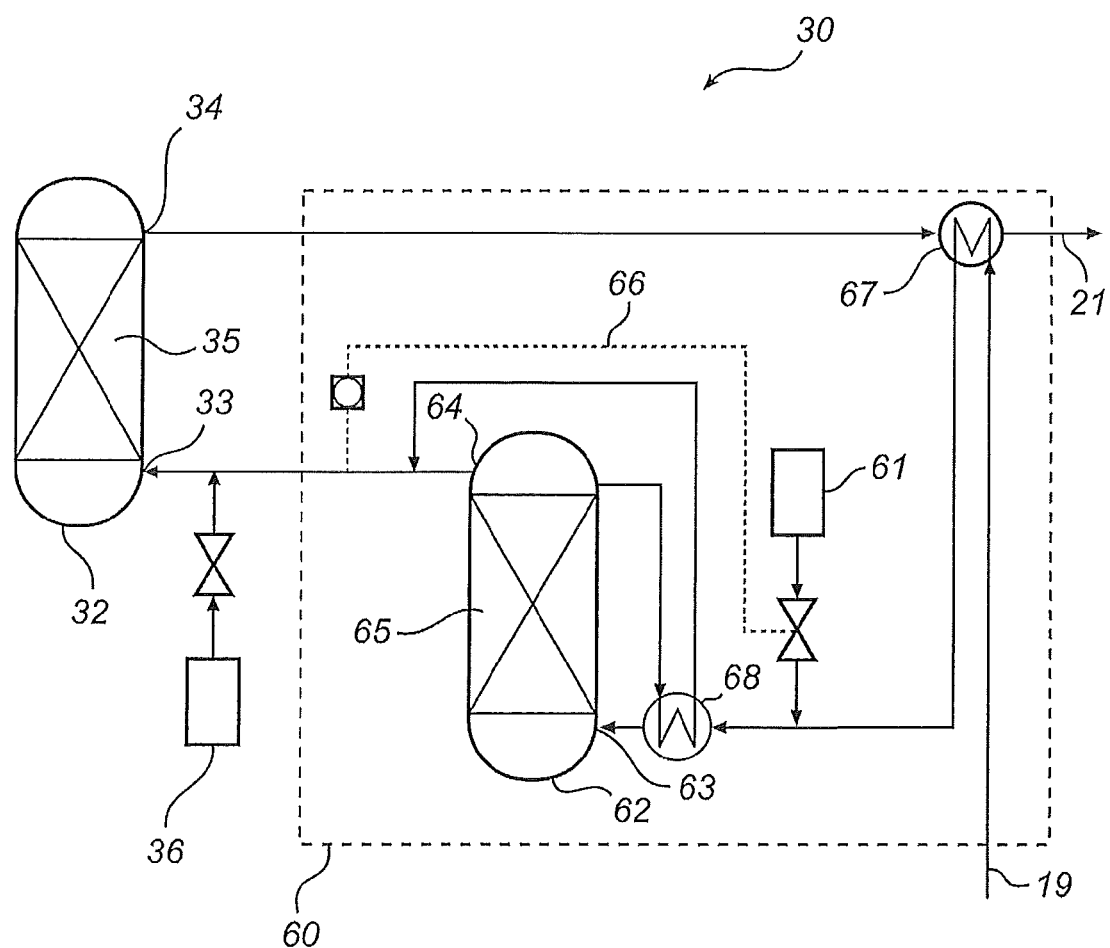
FIG. 2 schematically depicts an embodiment of a gas heater and SCR system.

FIG. 2 describes the SCR unit 30 in more detail. The carbon dioxide rich flue gas which has undergone flue gas condensation enters the SCR unit 30 via the fluidly connected duct 19. Depending on the position of the SCR and drier units with reference to the compression stages of the low pressure compression unit 18, the carbon dioxide rich flue gas may be at essentially atmospheric pressure or at a pressure of 2-55 bar absolute pressure, and, typically, at a temperature of 20 to 70° C. The preferred operation temperature of the SCR reactor is typically in the range of 190° C. to 600° C.

The SCR unit 30 comprises an SCR reactor 32 having a flue gas inlet 33, a flue gas outlet 34 and a catalyst bed 35 comprising an SCR catalyst. The SCR catalyst may be manufactured from a ceramic material, such as titanium oxide, used as a carrier, and at least one active catalytic component which is usually an oxide of a base metal (such as vanadium or tungsten), a zeolite, or a precious metal. The SCR unit 30 further comprises a reduction medium supply device 36 for injecting a gaseous reduction medium, typically anhydrous ammonia, aqueous ammonia or urea, into the flue gas fed to the SCR reactor 32.

The SCR unit 30 further comprises a flue gas heater 60 configured to heat the flue gas stream to a temperature suitable for selective catalytic reduction of $NO_X$. The flue gas heater 60 comprises a carburant supply device 61 and a catalyst system 62, wherein said catalyst system 62 is operative for removal of residual oxygen contained in the flue gas using carburant from the carburant supply device 61. The catalyst system 62 comprises a flue gas inlet 63, a flue gas outlet 64 and a catalyst bed 65. The carburant is added to the flue gas stream inside or upstream of the catalyst system 62, and oxygen in the flue gas is then removed in the catalyst bed 65 of the catalyst system 62 when oxidizing the carburant. The heat generated by this exothermic reaction causes the temperature of the flue gas to increase. The temperature increase can be controlled by adjusting of the amount of carburant added to the flue gas, e.g. using a temperature control valve 66 having a temperature sensor placed downstream of the flue gas outlet 64. According to an embodiment, the exothermic reaction increases the flue gas temperature to the temperature suitable for selective catalytic reduction (SCR) of $NO_X$, i.e. to in the range of 190° C. to 600° C., such as to in the range of 200° C. to 350° C. The carburant may be any combustible gas, liquid or even solid material that is compatible with the catalyst system. Examples of suitable carburants include hydrogen gas and other low sulfur carburants such as natural gas and methane. In the case of methane the catalytic oxidation temperature needed may be higher than the temperature needed for SCR operation. In such case a gas/gas heater is foreseen to cool the oxidation reactor effluent. The catalyst system 62 of the flue gas heater 60 may comprise a suitable reaction vessel, which contains oxidation catalyst of any suitable composition, e.g., in the form of a catalytic metal composition on a support. The catalytic metal composition may for example comprise platinum, palladium, platinum/rhenium, or any other catalytically active metal species or composition, effective to carry out the catalytic reduction operation. The catalytic metal composition may for example comprise platinum or palladium doped systems. The catalytic metal composition may be provided on a suitable support, such as a crimped metal foil, monolithic support, or other support medium and/or conformation.

The flue gas heater 60 may further comprise one or more heat exchangers 67, 68 configured to use the flue gas exiting the SCR reactor 32 or the catalyst system 62 as a heating medium for preheating the flue gas prior to heating in the flue gas heater.

To the heated flue gas fed to the SCR unit 30 a reduction medium is added. The reduction medium may, typically, be anhydrous ammonia, aqueous ammonia or urea. The reduction medium may for example be added to the flue gas stream via a reduction medium supply device 36 after pre-heating or after super-heating (as shown in FIG. 2). The reduction medium, e.g. ammonia, is mixed with the flue gas stream and adsorbed onto the SCR catalyst 35 in the SCR reactor 32. The SCR reactor 32 converts at least some of the $NO_X$ in the heated flue gas stream to $N_2$ by selective catalytic reduction.

Referring to FIG. 1, during operation the carbon dioxide rich flue gas enters the GPU 1 via the duct 2 and is introduced into the FGC 4. The carbon dioxide rich flue gas leaves the FGC 4 with a reduced water content via the duct 6.

The duct 6 forwards the carbon dioxide rich flue gas with a reduced water content to the first compression stage 12. A duct 13 forwards, optionally via a not shown intercooling unit, the compressed gas from the first compression stage 12 to the second compression stage 14. A duct 15 forwards, optionally via an intercooling unit 24, the compressed gas from the second compression stage 14 to the third compression stage 16. A duct 17,19 forwards the compressed gas from the third compression stage 16, via a mercury adsorption unit 26, to the SCR unit 30.

In the SCR unit 30, the flue gas is optionally pre-heated using the hot flue gas exiting the SCR reactor 32 and/or the catalyst system 62 as a heating medium. The flue gas is then mixed with carburant from the carburant supply device 61 and forwarded to the catalyst system 62. In the catalyst system 62, the carburant is oxidized by oxygen in the flue gas. The heat generated by this exothermic reaction causes the temperature of the flue gas to increase. Hot flue gas from the catalyst system 62 is mixed with a reduction medium from the reduction medium supply device 36 and forwarded to the SCR reactor 32, wherein at least a portion of the $NO_X$ present in the flue gas is reduced to $N_2$. The $NO_X$ depleted flue gas stream from the SCR unit 30 is then forwarded via the duct 21 to the adsorption drier 40. The GPU 1 may optionally comprise a flue gas economizer (not shown) arranged between the SCR unit 30 and the adsorption drier 40 and configured to recover heat from the flue gas stream leaving the SCR unit using, e.g. boiler feed water. The adsorption drier 40 is provided with a packing comprising a water vapour adsorbent, also referred to as a desiccant, having affinity for water vapour. The desiccant may, for example, be silica gel, calcium sulfate, calcium chloride, montmorillonite clay, molecular sieves, or another material that is, as such, known for its use as a desiccant. Hence, as the further cooled compressed carbon dioxide rich flue gas passes through the packing, at least a portion of the content of water vapour of the gas will be adsorbed on the desiccant of the packing.

The compressed gas, from which at least a portion of its $NO_X$ and water content has been removed, is forwarded via a duct 23 from the adsorption drier 40 to optional further units of the GPU 1. Examples of such optional further units of the GPU 1 include a non-condensable gas removal unit, for example a $CO_2$ separation unit 50, in which the gas is cooled in a heat-exchanger, often called a cold-box, to cause liquefaction of the carbon dioxide such that the carbon dioxide can be separated from gases, such as nitrogen, that are not liquefied at the same temperature as carbon dioxide.

Furthermore, the GPU 1 may comprise a high pressure compression unit 52 arranged downstream, as seen with respect to the transport direction of the carbon dioxide, of the $CO_2$ separation unit 50, and comprising one or more compression stages for compressing the carbon dioxide to a suitable pressure for sequestration. After compression of the gas in the high pressure compression unit 52, the compressed carbon dioxide, which may be in a supercritical or liquid state, is forwarded, to a $CO_2$ sequestration site 54.

It will be appreciated that numerous variants of the embodiments described above are possible within the scope of the appended claims. Particularly, it will be appreciated that the SCR and drier units may be arranged in a number of different positions downstream of the dust removal unit and flue gas condenser, while still upstream of the $CO_2$ separation unit, with reference to the general flow direction of the flue gas stream.

Hereinbefore it has been described how a gas purification system including an SCR reactor and flue gas heater for $NO_X$ removal, may be integrated as part of a GPU, as illustrated in FIGS. 1-2. It will be appreciated that a gas purification system of this type, and a method of operating it, may also be integrated in other types of processes, where there is a need for removing Oxygen from a carbon dioxide rich flue gas stream. Furthermore, the gas purification system of the above mentioned type may also be integrated in other parts of the GPU than those described hereinbefore.

While the invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of cleaning a carbon dioxide rich flue gas stream containing oxygen, said method comprising:
   heating the flue gas stream to a temperature suitable for selective catalytic reduction (SCR) of NOX; and
   reducing at least some of the NOX in the heated flue gas stream to N2 by SCR;
   wherein heating of the flue gas stream comprises catalytic reduction of residual oxygen contained in the flue gas with a suitable carburant.

2. The method according to claim 1, wherein said heating comprises:
   pre-heating the flue gas stream to a first temperature by indirect heat-exchange with the flue gas stream resulting from the SCR; and then
   super-heating the pre-heated flue gas stream to a temperature suitable for selective catalytic reduction (SCR) of NOX,
   wherein said super-heating of the flue gas stream comprises catalytic reduction of residual oxygen contained in the flue gas with a suitable carburant.

3. The method according to claim 1, wherein said carburant is selected from the group consisting of hydrogen gas, methane and natural gas, or a mixture thereof.

4. The method according to claim 1, wherein said temperature suitable for selective catalytic reduction (SCR) of NOX is in the range of 190° C. to 600° C.

5. The method according to claim 1, further comprising subjecting the flue gas stream to flue gas condensation prior to heating the flue gas stream.

6. The method according to claim 1, further comprising subjecting the flue gas stream to compression to a pressure in the range of 2 to 55 bar absolute prior to heating the flue gas stream.

7. The method according to claim 1, further comprising removing at least some of the water vapor from the NOX depleted flue gas stream by adsorption in an adsorption drier.

8. A gas processing unit for cleaning a carbon dioxide rich flue gas stream containing oxygen, said unit comprising:
   a flue gas heater configured to heat the flue gas stream to a temperature suitable for selective catalytic reduction of NOX; and
   a selective catalytic reduction reactor (SCR reactor) configured to receive heated flue gas from the flue gas heater and reduce at least some of the NOX in the heated flue gas stream to N2 by selective catalytic reduction;
   wherein said flue gas heater comprises a carburant supply device and a catalyst system, wherein said catalyst system is operative for reduction of residual oxygen contained in the flue gas using carburant from the carburant supply device.

9. The gas processing unit according to claim 8, wherein said flue gas heater comprises:

a flue gas pre-heater configured to heat the flue gas stream to a first temperature by indirect heat-exchange with the flue gas stream leaving the SCR reactor; and a flue gas super-heater configured to heat the pre-heated flue gas stream to temperature suitable for selective catalytic reduction (SCR) of NOX, wherein said flue gas super-heater comprises a carburant supply device and a catalyst system, wherein said catalyst system is operative for reduction of residual oxygen contained in the flue gas using carburant from the carburant supply device.

10. The gas processing unit according to claim 8, further comprising a flue gas condenser arranged upstream of the flue gas heater.

11. The gas processing unit according to claim 8, further comprising a flue gas compressor arranged upstream of the flue gas heater.

12. The gas processing unit according to claim 8, further comprising an adsorption drier configured to remove at least some of the water from the NOX depleted flue gas stream by adsorption.

13. The method according to claim 1, wherein said temperature suitable for selective catalytic reduction (SCR) of NOX is in the range of 200° C. to 350° C.

14. A method of purifying a carbon dioxide rich flue gas stream containing oxygen to increase the carbon dioxide composition of the flue gas, said method comprising:
compressing a carbon dioxide rich flue gas;
passing the compressed carbon dioxide rich flue gas through a mercury adsorption unit;
feeding the carbon dioxide rich flue gas through a selective catalytic reduction (SCR) unit after the flue gas is passed through the mercury adsorption unit;
feeding a carburant to the carbon dioxide rich flue gas while the flue gas is passed through the SCR unit inside or upstream of a catalyst system of the SCR unit; and
passing the flue gas having the carburant fed therein through a catalyst bed of the catalyst system to remove oxygen from the flue gas when oxidizing the carburant.

15. The method of claim 14, comprising:
controlling a temperature increase of the flue gas passing through a flue gas heater of the SCR unit by adjusting an amount of carburant added to the flue gas.

16. The method of claim 15, comprising:
pre-heating the flue gas to be fed into the flue gas heater of the SCR unit via at least one heat exchanger that uses flue gas exiting an SCR reactor of the SCR unit or flue gas exiting the catalyst system of the SCR unit as a heating medium for pre-heating the flue gas to be fed into the flue gas heater of the SCR unit.

17. The method of claim 16, comprising:
passing the flue gas from the SCR unit to an adsorption drier to remove water vapor from the carbon dioxide rich flue gas.

18. The method of claim 17, comprising:
liquifying the carbon dioxide rich flue gas after the flue gas exits the adsorption drier.

19. A gas processing unit comprising:
a selective catalytic reduction (SCR) unit configured to receive a carbon dioxide rich flue gas, the SCR unit comprising a carburant supply and a catalyst system;
the carburant supply configured to feed a carburant to the carbon dioxide rich flue gas while the flue gas is passed through the SCR unit inside or upstream of the catalyst system; and
a catalyst bed of the catalyst system is configured such that the flue gas having the carburant is passed through the catalyst bed to remove oxygen from the flue gas when oxidizing the carburant.

20. The gas processing unit of claim 19, wherein the SCR unit includes at least one heat exchanger that is configured to pre-heat flue gas to be fed to a flue gas heater of the SCR unit, the heat exchanger configured such that flue gas exiting an SCR reactor of the SCR unit or flue gas exiting the catalyst system of the SCR unit is a heating medium for pre-heating the flue gas to be fed into the flue gas heater of the SCR unit.

* * * * *